United States Patent [19]

Parry

[11] 3,854,621

[45] Dec. 17, 1974

[54] AUXILIARY STORAGE DEVICE FOR VEHICLES

[75] Inventor: Alan C. Parry, Des Moines, Iowa

[73] Assignee: Mid-America Body & Equipment Co. Inc., West Des Moines, Iowa

[22] Filed: May 7, 1973

[21] Appl. No.: 358,007

[52] U.S. Cl.................... 220/20, 220/22, 296/37 R
[51] Int. Cl.......................................... B65d 85/00
[58] Field of Search ............ 220/20, 22, 22.1, 22.3, 220/22.4, 22.5, 22.6; 296/37 R; 137/571, 137/575, 576

[56] References Cited
UNITED STATES PATENTS

| | | | |
|---|---|---|---|
| 1,404,484 | 1/1922 | Schoonmaker | 296/37 R |
| 1,596,526 | 8/1926 | Griffin | 137/356 X |
| 1,990,605 | 2/1935 | Johnson | 137/356 |
| 3,586,363 | 6/1971 | Omlid | 137/575 X |
| 3,664,704 | 5/1972 | Ellis | 280/5 A X |
| 3,727,971 | 4/1973 | Sisler | 296/37 R |

Primary Examiner—William I. Price
Assistant Examiner—Steven M. Pollard
Attorney, Agent, or Firm—Rudolph L. Lowell

[57] ABSTRACT

An auxiliary storage device for vehicles includes a housing having a plurality of outer walls and at least one interior wall to form at least two enclosed compartments therein. A fuel spout is mounted in one of the exterior walls of the housing and provides communication to the interior of one of said compartments where fuel may be stored. The other compartment includes at least one door therein for providing access to the interior so that tools or other materials may be stored therein. The storage device is adapted to be mounted in the box portion of conventional pickup trucks.

3 Claims, 5 Drawing Figures

PATENTED DEC 17 1974

3,854,621

AUXILIARY STORAGE DEVICE FOR VEHICLES

This invention relates to an auxiliary storage device for vehicles.

In recent years, camping has become a very popular pastime. Campers, pickups pulling trailers, and other vehicles for camping have become very much in demand. Such devices, however, require storage space for tools. Furthermore, most devices add considerable weight to the vehicle, and result in low fuel mileage. Consequently there is a need for storage of extra fuel to supplement the normal fuel supply for vehicles.

The present invention provides an auxiliary storage device for vehicles which includes a fuel storage compartment and a second storage compartment which may be used to store tools or other equipment. The present invention is adapted to be mounted within the forward end of a box of conventional pickup trucks. Thus it can be used when the pickup truck is used to tow trailers and the like.

The primary object of the present invention is the provision of an auxiliary storage device for vehicles which will provide storage for fuel and tools or other equipment.

A further object of the present invention is the provision of a storage device which includes a fuel tank and a tool storage compartment which are easily accessible.

A further object of the present invention is the provision of a storage device which keeps the stored fuel in a low position so as to make the vehicle more stable.

A further object of the present invention is the provision of a device which may be readily detachably mounted in the box portion of most conventional pickup trucks.

A further object of the present invention is the provision of a device which will not slide forwardly when the vehicle stops quickly.

A further object of the present invention is the provision of a device having an auxiliary fuel tank which can be connected to the regular fuel tank of the vehicle.

A further object of the present invention is the provision of a device which is economical to manufacture, durable in use, and attractive in appearance.

This invention consists in the construction, arrangemments and combination of the various parts of the device, whereby the objects contemplated are attained as hereinafter more fully set forth, specifically pointed out in the claims, and illustrated in the accompanying drawings in which:

Figure 1:
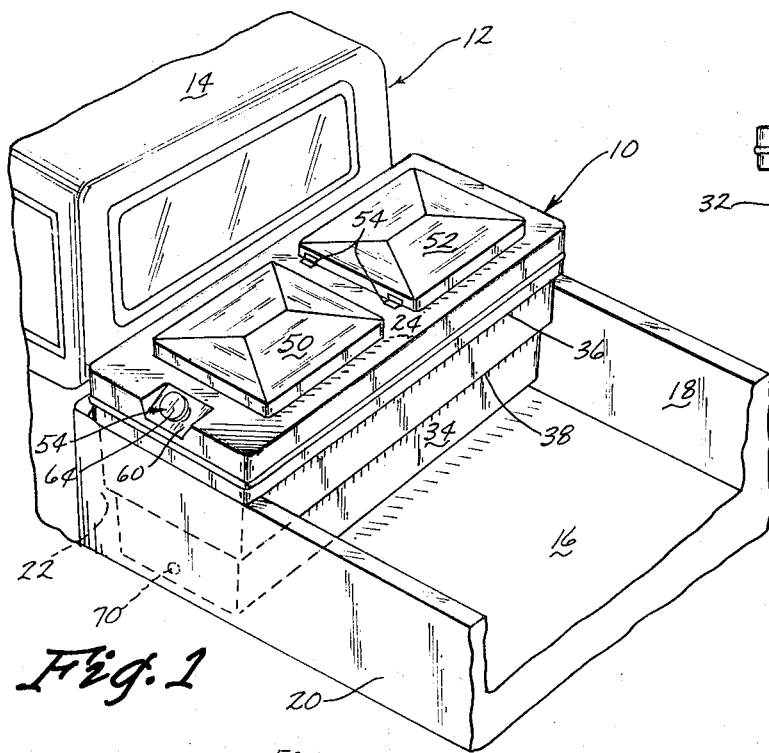
FIG. 1 is a perspective view of a pickup truck having the present invention mounted therein.
Figure 3:
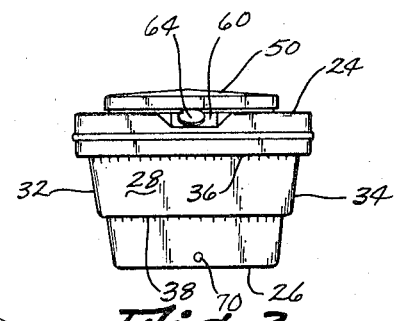
FIG. 3 is an end view as seen from the left end of FIG. 2.
Figure 2:
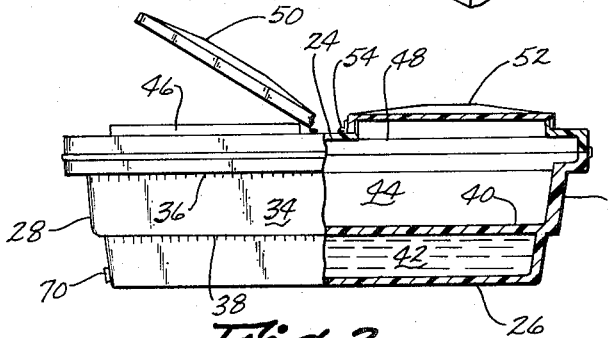
FIG. 2 is a rear view of the present invention with one of the housing walls broken away.
Figure 4:
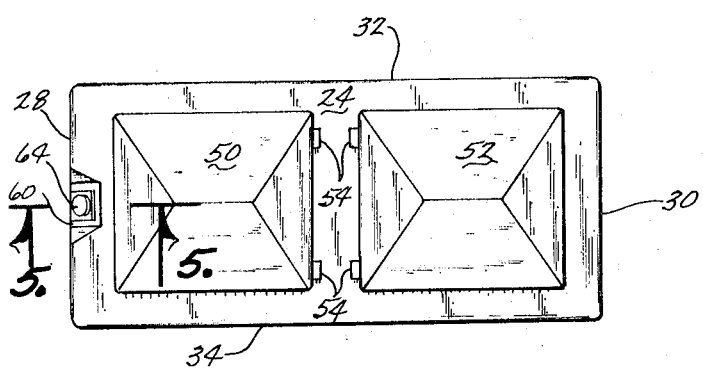
FIG. 4 is a top view of the present invention.

Referring to FIG. 1, a storage device 10 is shown mounted within the box of a pickup truck 12. Truck 12 includes a cab 14 and a box having a floor 16 opposite side walls 18 and 20 and a front wall 22. Device 10 may be constructed of fiberglass, wood, metal, or any other suitable material. It includes an outer housing comprising a top wall 24, a bottom wall 26, opposite end walls 28, 30, a front wall 32 and a rearwall 34. Walls 28, 30, 32 and 34 are tapered downwardly and are also stepped so as to provide two horizontal downwardly presented shoulders 36, 38 which extend around the entire perimeter of device 10. Shoulder 36 rests on the upper edges of side walls 18 and 20 of the box of truck 10. Thus it can be seen that the device is adaptable to conventional pickup trucks.

A horizontal inner wall 40 divides the interior of device 10 into a fuel storage compartment 42 and a tool storage compartment 44. Two rectangular-shaped door openings 46, 48 are provided in top wall 24 of device 10 and provide access into the interior of the tool storage compartment 44. A pair of rectangularly-shaped doors 50, 52 are mounted to top wall 24 by means of hinges 54 and are adapted to fold over door openings 46, 48, respectively.

A fuel spout 54 includes a conduit 56 extending from the upper corner of end wall 28 downwardly to horizontal inner wall 40. Conduit 56 protrudes through inner wall 40 so as to provide communication into fuel storage compartment 42. A pair of nut couplings 58 secure conduit 56 to inner wall 40. Similarly, the upper end of conduit 56 extends through a diagonal portion 60 of end wall 28. Nut couplings 62 secure the upper end of conduit 56 to diagonal portions 60. Thus conduit 56 provides communication from the exterior of device 10 to the interior of fuel storage compartment 42. A fuel cap 64 is detachably mounted on the upper end of conduit 56.

Figure 5:
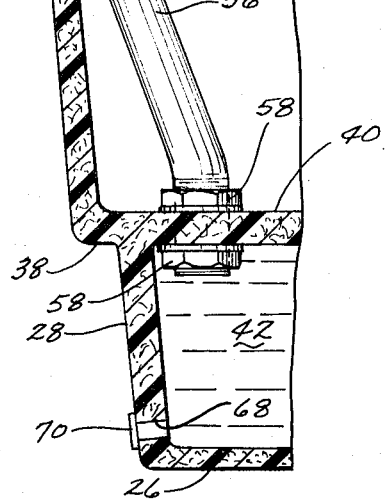
FIG. 5 is an enlarged sectional view of the left end of the device shown in FIG. 2.

Device 10 may be detachably secured to vehicle 12 by means of a plurality of screws or bolts 66 (FIG. 5) which extend through front wall 32 of device 10 and are attached to front wall 22 of the box of vehicle 12.

Tools or other equipment may be stored in tool storage compartment 44, and may be inserted or removed through openings 46, 48. Fuel may be stored in fuel storage compartment 42 by pouring it through conduit 56. Furthermore, fuel storage compartment 42 includes an outlet opening 68 to which may be connected a hose or other type of conduit for conveying the fuel from the auxiliary fuel storage compartment 42 to the conventional fuel compartment of the vehicle 12. If such a connection is not desired, outlet 68 may be plugged with a detachable plug 70. In the event that it is desired to connect compartment 42 with the fuel tank of a vehicle, plug 70 is removed and a valve is inserted in its place so as to permit the opening and closing of the valve to selectively permit the fuel to flow from compartment 42 to the fuel tank of the vehicle.

The tapered shape of device 10, together with shoulders 36, 38, make it easily adaptable to the boxes of conventional pickup trucks. Furthermore, the fact that the fuel is in the lower portion of the device 10 and also adjacent the bottom wall 16 of the box of truck 12, lends considerable stability to the vehicle by keeping the low center of gravity thereof. Such stability is a considerable problem when the vehicle is used to support a camper super structure, or is used to pull a cumbersome trailer. The device is easily accessible, and can be easily attached or removed from vehicle 10 at the user's choice. Thus it can be seen that the device accomplishes at least all of its stated objectives.

I claim:

1. An auxiliary storage device for vehicles having a box therein with opposite side walls, a front wall, and a floor, said storage device comprising:

a. a housing hving a plurality of exterior walls and at least one interior wall to form at least two enclosed compartments therein;
b. a fuel spout mounted in one of said exterior walls and providing communications from the interior of one of said compartments to the exterior of said housing whereby fuel may be introduced into one of said compartments;
c. at least one door opening in said one exterior wall providing communication into the other of said compartments;
d. a door covering for said door opening movable out of a covering relation with said door opening to provide access to the interior of said other compartment;
e. said one interior wall being horizontal and located below said one exterior wall which constitutes the top wall of said housing and said one compartment constituting a fuel storage compartment positioned below said other storage compartment,
f. said fuel spout extended from said one exterior wall through said other compartment and said one interior wall into said fuel storage compartment, said fuel storage compartment having a bottom wall and a plurality of side walls formed by certain of said exterior housing walls and an outlet opening in one of said certain exterior walls adjacent the bottom wall of said fuel storage compartment for removal of fuel therein;
g. means for covering said outlet opening selectively movable to open and close said outlet opening; and h. said housing including a horizontal flange extended around the upper exterior surface thereof having a downwardly facing horizontal shoulder for engagement with said opposite side walls of the vehicle box;
i. said top wall having a second door opening therein, and
j. a second door positioned in a covering relation over said second door opening to provide access into said other compartments.

2. A storage device according to claim 1 wherein:
a. said exterior walls of the housing include a front wall, a rear wall, opposite end walls, and a bottom wall, said end walls of said housing abutting against said opposite side walls of the vehicle box, and
b. said front wall of said housing abutting against and being detachably secured to said front wall of said vehicle box.

3. An auxiliary storage device for vehicles having a box therein with opposite side walls, a front wall, and a floor, said storage device comprising:
a. an elongated housing having a plurality of exterior walls including a top wall, a front wall, and end walls and at least one interior wall to form at least two enclosed compartments therein;
b. a fuel spout mounted in said top wall providing communication from the interior of one of said compartments to the exterior of said housing whereby fuel may be introduced into one of said compartments;
c. at least one door opening in said top wall providing communication into the other of said compartments;
d. a door covering for said door opening movable out of a covering relation with said door opening to provide access to the interior of said other compartment;
e. said one interior wall being horizontal and located below said top wall and said one compartment constituting a fuel storage compartment positioned below said other storage compartment,
f. said fuel spout extended from said top wall through said other compartment and said one interior wall into said fuel storage compartment, said fuel storage compartment having a bottom wall and a plurality of side walls formed by certain of said exterior housing walls and an outlet opening in one of said certain exterior walls for removal of fuel from said fuel storage compartment, and
g. means for selectively opening and closing said outlet opening;
h. said housing having a length slightly less than the spacing between said opposite side walls and a flange extended transversely of the upper exterior surface of each end wall thereof having a downwardly facing horizontal shoulder engageable with the upper surface of a corresponding adjacent one of said opposite side walls of the vehicle box, said housing front wall positionable against and detachably secured to the front wall of said vehicle box.

* * * * *